Patented Dec. 28, 1943

2,337,547

UNITED STATES PATENT OFFICE 2,337,547

REACTION PRODUCT OF ALDEHYDES AND DIAZINE DERIVATIVES

Gaetano F. D'Alelio and James W. Underwood, Pittsfield, Mass., assignors to General Electric Company, a corporation of New York No Drawing. Application August 30, 1941, Serial No. 409,024

18 Claims. (Cl. 260—69)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a diazine derivative corresponding to the following general formula:

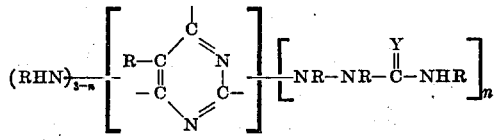

In the above formula $n$ represents an integer and is at least 1 and not more than 3, Y represents a member of the class consisting of oxygen and sulfur, and R represents a member of the class consisting of hydrogen and monovalent hydrocarbon and halo-hydrocarbon radicals, numerous examples of which hereafter are given. From a consideration of the formula it will be seen that when $n$ is 3 there will be no amino (—NHR) groups attached to the diazine nucleus. Instead of the semicarbazido or thiosemicarbazido 1,3- or meta-diazines (semicarbazido or thiosemicarbazido pyrimidines) represented by the above formula, the corresponding 1,2,- or ortho-diazines (pyridazines) or the 1,4- or para-diazines (pyrazines) may be used.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlorethyl, dichlorphenyl, ethyl chlorphenyl, phenyl chlorethyl, brompropyl, bromtolyl, etc. Preferably R is hydrogen.

More specific examples of semicarbazido and thiosemicarbazido diazines that may be employed in producing our new condensation products are the tri-semicarbazido 1,3- diazines, the tri-(thiosemicarbazido) 1,3-diazines, the monoamino (—NHR) di-semicarbazido 1,3-diazines, the monoamino (—NHR) di-(thiosemicarbazido) 1,3-diazines, the diamino [(—NHR)$_2$] monosemicarbazido 1,3-diazines and the diamino [(—NHR)$_2$] mono-(thiosemicarbazido) 1,3-diazines.

The semicarbazido and thiosemicarbazido diazines that are used in carrying the present invention into effect are more fully described and are specifically claimed in our copending application Serial No. 409,025, filed concurrently herewith and assigned to the same assignee as the present invention, now Patent No. 2,295,564.

Other and more specific examples of semicarbazido and thiosemicarbazido diazines that may be used in producing our new condensation products are listed below:

4-semicarbazido 2,6-diamino 1,3-diazine
2-semicarbazido 4,6-diamino 1,3-diazine
2-semicarbazido 4,6-di-(ethylamino) 1,3-diazine
2-(4'-ethyl semicarbazido) 4,6-diamino 1,3-diazine
4-semicarbazido 5-methyl 2,6-di-(methylamino) 1,3-diazine
4-(4'-methyl thiosemicarbazido) 2-amino 5-phenyl 6-anilino 1,3-diazine
4,6-di-(4'-methyl semicarbazido) 2-amino 1,3-diazine
2-thiosemicarbazido 4-ethylamino 6-anilino 1,3-diazine
2-semicarbazido 4-methylamino 6-amino 1,3-diazine
2-semicarbazido 4-propylamino 6-anilino 1,3-diazine
2-(2',4'-diethyl semicarbazido) 4,6-diamino 1,3-diazine
2-(1'-phenyl 4'-methyl semicarbazido) 4,6-di-(ethylamino) 1,3-diazine
2-[4'-(beta chlorethyl) semicarbazido] 4,6-diamino 1,3-diazine
2-thiosemicarbazido 4,6-diamino 1,3-diazine
2,4-di-semicarbazido 6-amino 1,3-diazine
2,4,6-tri-semicarbazido 5-methyl 1,3-diazine
2,4,6-tri-(thiosemicarbazido) 5-chlorethyl 1,3-diazine
2-(2'-ethyl thiosemicarbazido) 4,6-di-anilino 1,3-diazine
2-thiosemicarbazido 4,6-di-(ethylamino) 1,3-diazine
2-(1'-ethyl 4'-phenyl thiosemicarbazido) 4,6-di-amino 1,3-diazine 2-(2',4'-diethyl thiosemicarbazido) 4,6-diamino 1,3-diazine
2-semicarbazido 4,6-di-(propylamino) 1,3-diazine
2-semicarbazido 4,6-di-(cyclohexylamino) 1,3-diazine
2-semicarbazido 4,6-di-(chloranilino) 1,3-diazine
2,4-di-(thiosemicarbazido) 6-amino 1,3-diazine
2-semicarbazido 4-thiosemicarbazido 6-amino 1,3-diazine
2-thiosemicarbazido 5-ethyl 4,6-di-(ethylamino) 1,3-diazine
2,4,6-tri-(thiosemicarbazido) 1,3-diazine
2,4-di-(thiosemicarbazido) 5-methyl 6-amino 1,3-diazine
2-semicarbazido 4,6-di-(chlorethylamino) 1,3-diazine
4-thiosemicarbazido 2,6-diamino 1,3-diazine
4-semicarbazido 2,6-di-(methylamino) 1,3-diazine The formulas for most of the above compounds are shown in our above-identified copending application Serial No. 409,025.

The present invention is based on our discovery that new and valuable materials of particular utility in the plastics and coating arts can be produced by effecting reaction between ingredients comprising an aldehyde, including polymeric aldehydes and aldehyde-addition products, and diazines (more particularly the 1,3-diazines) containing at least one semicarbazido (—NRNRCONHR)

or thiosemicarbazido (—NRNRCSNHR) substituent attached directly to a carbon atom of the diazine nucleus.

It has been suggested heretofore that resinous materials be prepared by condensing an aliphatic aldehyde containing a chain of at the most four carbon atoms with compounds of the general formula

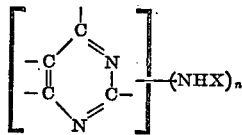

wherein $n$ is at least 2, X stands for a member of the group consisting of hydrogen and —NH₂, and wherein to the carbon atoms are attached hydrogen or radicals of the group consisting of the aforesaid —NHX groups, alkyl, phenyl, phenylene, hydroxy, alkoxy, mercapto, thioether and substituted amino groups. However, to the best of our knowledge and belief it was not known prior to our invention to prepare condensation products of aldehydes with semicarbazido and thiosemicarbazido diazines, which diazine derivatives are believed to be new chemical compounds.

The heretofore-known aminodiazine-aldehyde resinous condensation products have excellent heat and water resistance, but are deficient in other properties that are desirable in a resin to be used in the production of molding compounds and molded articles. The semicarbazide-aldehyde and thiosemicarbazide-aldehyde resins, on the other hand, have much better flow characteristics than the aminodiazine-aldehyde resins but are less resistant to water. The resinous condensation products of the present invention have a high water resistance approximating that of the known aminodiazine-aldehyde resins plus the improved flow characteristics of the semicarbazide-aldehyde and thiosemicarbazide-aldehyde resins. The heat resistance and curing characteristics of our new resins also are much better than those of the semicarbazide-aldehyde and thiosemicarbazide-aldehyde resins.

Thus it is seen that the present invention provides a resinous composition which has combined therein the desirable properties of the conventional aminodiazine-aldehyde and semicarbazide-aldehyde (or thiosemicarbazide-aldehyde) resins without sacrifice of other useful properties. This is a surprising and unexpected result that in no way could have been predicted. Because of the unique properties of the resins of this invention, they are suitable for molding and other applications for which the ordinary aminodiazine-aldehyde and semicarbazide-aldehyde (or thiosemicarbazide-aldehyde) resins, as well as other resins of the aminoplast type, e. g., urea-aldehyde resins, are unsuited.

In practicing our invention the initial condensation reaction may be carried out at normal or at elevated temperatures, at atmospheric, subatmospheric or superatmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tricresyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the semicarbazido or thiosemicarbazido diazine, or mixture of semicarbazido and thiosemicarbazido diazines, may be carried out in the presence of solvents or diluents, fillers, other natural or synthetic resinous bodies, or while admixed with other materials that also can react with the aldehydic reactant or with the diazine derivative, e. g., ketones, urea, thiourea, selenourea, iminourea (guanidine), substituted ureas, thioureas, selenoureas and iminoureas, numerous examples of which are given in various copending applications of one of us (Gaetano F.

D'Alelio), for instance in D'Alelio copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the semicarbazido and thiosemicarbazido diazines constituting the primary components of the resins of the present invention; aminotriazines, e. g., melamine, ammeline, ammelide, numerous other examples being given in various D'Alelio copending applications, for instance in application Serial No. 377,524, filed February 5, 1941, and in applications referred to in said copending application; ureido and thioureido triazines, specifically the ureido and thioureido 1,3,5-triazines, numerous examples of which are given in D'Alelio copending application Serial No. 404,661, filed July 30, 1941, now Patent No. 2,312,688, issued March 2, 1943; semicarbazido and thiosemicarbazido triazines, more particularly the semicarbazido and thiosemicarbazido 1,3,5-triazines, numerous examples of which are given in our copending application Serial No. 409,023, filed Aug. 30, 1941; phenol and substituted phenols, e. g., the cresols, the xylenols, the tertiary alkyl phenols and other phenols such as mentioned in D'Alelio Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like.

The modifying reactants may be incorporated with the diazine derivative and the aldehyde by mixing all the reactants and effecting condensation therebetween or by various permutations of reactants as described, for example, in D'Alelio copending application Serial No. 363,037 with particular reference to reactions involving a urea, an aldehyde and a semi-amide of oxalic acid. For instance, we may form a partial condensation product of ingredients comprising urea or melamine, a semicarbazido or thiosemicarbazido diazine of the kind herein described (for example, 4-semicarbazido 2,6-di-(methylamino) 1,3-diazine, 2-semicarbazido 4,6-diamino 1,3-diazine, 4-semicarbazido 2,6-diamino 1,3-diazine, 2,4,6-trisemicarbazido 1,3-diazine, etc.) and an aldehyde, including polymeric aldehydes and aldehyde-addition products, for instance formaldehyde, paraformaldehyde, dimethylol urea, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention show excellent flow characteristics during a short curing cycle. This is a property that is particularly desirable in a molding compound. The molded resins are exceptionally light in color. The molded articles have good surface finish and excellent resistance to water and arcing. The pH at which the heat-curable resins of this invention cure generally is of the order of 5.0 to 8.0 or higher. Basic fillers such as asbestos, therefore, can be used satisfactorily in the production of molding compounds without detrimental effect upon the rapidity of cure of the compound.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, such as glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| 4-semicarbazido 2,6-di-(methylamino) 1,3-diazine | 31.7 |
| Aqueous formaldehyde (approx. 37.1% HCHO) | 48.6 |
| Sodium hydroxide in 2 parts water | 0.04 |

All of the above components with the exception of the sodium hydroxide were heated together under reflux at the boiling temperature of the mass for 8 minutes. At the end of this period of time a resin began to precipitate from the solution. The sodium hydroxide solution was now added and the resulting resinous syrup was mixed immediately with 23.4 parts alpha cellulose in flock form and 0.2 part of a mold lubricant, specifically zinc stearate. The resulting wet molding composition was dried at room temperature until sufficient moisture had been removed for satisfactory molding of the compound. A sample of the dried molding compound was molded for 3 minutes at 135° C. under a pressure of 2,000 pounds per square inch, yielding a molded piece that was well-cured throughout and that had a high degree of resiliency. The molding compound also showed good flow characteristics during molding.

When a sample of the resinous syrup, to which the sodium hydroxide had been added, was heated on a 140° C. hotplate, it cured to an infusible mass in the absence of a curing agent.

Example 2

| | Parts |
|---|---|
| 4-semicarbazido 2,6-di-(methylamino) 1,3-diazine | 6.3 |
| Urea | 14.4 |
| Aqueous formaldehyde (approx. 37.1% HCHO) | 48.6 |
| Sodium hydroxide in 1.5 parts water | 0.03 |
| Chloracetamide (monochloracetamide) | 0.3 |

All of the above components with the exception of the sodium hydroxide and chloracetamide were heated together under reflux for 3 minutes. The sodium hydroxide was now added and refluxing was continued for an additional 15 minutes. At the end of this period of time the chloracetamide was added and heating under reflux at the boiling temperature of the mass was continued for 4 minutes more. The pH of the resulting resinous syrup was 7.81. A molding compound was made from the syrupy condensation product by mixing therewith 19.8 parts alpha cellulose and 0.2 part zinc stearate. The wet compound was dried at 60° C. Well-cured molded articles were produced by molding samples of the dried compound at a temperature of 135° C. and under a pressure of 2,000 pounds per square inch.

Example 3

| | Parts |
|---|---|
| 4-semicarbazido 2,6-di-(methylamino) 1,3-diazine | 15.8 |
| Sulfanilamide | 12.9 |
| Aqueous formaldehyde (approx. 37.1% HCHO) | 48.6 |
| Sodium hydroxide in 2 parts water | 0.04 |
| Chloracetamide | 0.4 |

All of the above ingredients with the exception of the chloracetamide were heated together under reflux at the boiling temperature of the mass for 9 minutes. The chloracetamide was now added and refluxing was continued for an additional 4 minutes. The pH of the resulting resinous syrup was 8.47. A molding (moldable) compound was made from this syrup by mixing it with 22.4 parts alpha cellulose and 0.2 part zinc stearate. The wet molding compound was dried at 60° C. A sample of the dried molding compound was molded for 3 minutes at 135° C. under a pressure of 2,000 pounds per square inch. The molded article possessed excellent cohesion and had a high degree of water resistance. It also was well cured throughout and was quite resilient.

Example 4

| | Parts |
|---|---|
| 4-semicarbazido 2,6-di-(methylamino) 1,3-diazine | 31.7 |
| Dimethylol urea (technical grade, containing approx. 11% by weight of water) | 80.8 |
| Sodium hydroxide in 3 parts water | 0.06 |
| Chloracetamide | 0.6 |
| Water | 80.0 |

All of the components with the exception of the chloracetamide were heated together under reflux for 15 minutes, after which the chloracetamide was added and refluxing was continued for an additional 5 minutes thereby to cause the chloracetamide to intercondense with the dimethylol urea-diazine derivative partial condensation product. The resulting resinous syrup had a pH of 8.0. This syrup was mixed with 34.2 parts alpha cellulose and 0.2 part zinc stearate to form a molding compound. The wet compound was dried at 60° C., after which a sample of it was molded for 15 minutes at 135° C. under a pressure of 2,000 pounds per square inch. The molding compound showed excellent flow characteristics during molding. The molded piece was well knitted together and was well cured throughout. It also was fairly resilient and had a high resistance to heat and water.

Example 5

| | Parts |
|---|---|
| 4-semicarbazido 2,6-di-(methylamino) 1,3-diazine | 31.7 |
| Acrolein | 33.6 |
| Sodium hydroxide in 1.5 parts water | 0.03 |
| Water | 200.0 | were mixed together. An exothermic reaction took place upon the addition of the acrolein, resulting in a rapid precipitation of a resinous product. When a sample of the precipitated resin was dehydrated by heating it on a 140° C. hotplate, it cured to an infusible mass in the absence of a curing agent.

Example 6

| | Parts |
|---|---|
| 4-semicarbazido 2,6-di-(methylamino) 1,3-diazine | 31.7 |
| Butyl alcohol | 55.5 |
| Aqueous formaldehyde (approx. 37.1% HCHO) | 48.6 |
| Sodium hydroxide in 3 parts water | 0.06 | were heated together under reflux at the boiling temperature of the mass for 15 minutes. The resulting syrupy condensation product was dehydrated by heating it on a steam plate. The dehydrated, fusible resin was soluble in ethylene glycol but was insoluble in water, ethyl alcohol, butyl alcohol, benzene and Solvatone. The addition of chloracetamide, citric acid, glycine, phthalic anhydride and other curing agents, either to the syrupy or dehydrated reaction product, yielded a resinous material that was convertible at temperatures of the order of 140° C. to a heat-hardened, infusible state. The solubility and film-forming characteristics of the alcohol-modified semicarbazidodiazineformaldehyde condensation product of this example make it especially suitable for use in the production of spirit and baking varnishes. For example, it may be used as a modifier of varnishes of the aminoplast and alkyd-resin types.

Example 7

| | Parts |
|---|---|
| 4-semicarbazido 2,6-di-(methylamino) 1,3-diazine | 31.7 |
| Acetamide | 8.8 |
| Aqueous formaldehyde (approx. 37.1% HCHO) | 48.6 |
| Sodium hydroxide in 2 parts water | 0.04 | were heated together under reflux at boiling temperature for 15 minutes. When a sample of the resulting syrup was mixed with chloracetamide, followed by heating on a 140° C. hotplate, it cured to an insoluble, infusible mass. A sample of the initial resin syrup (that is, the syrup to which no chloracetamide had been added) was applied to a glass plate and the coated plate then was heated at 60° C. for several hours. A smooth, thermoplastic, baked film was formed on the plate. A small amount of hydrochloric acid was added to another sample of the initial resin syrup and a glass plate was coated with the hydrochloric acid-treated resin syrup. The coated plate likewise was heated at 60° C. for several hours. The baked film on the plate was hard, transparent, flexible and water resistant.

Example 8

| | Parts |
|---|---|
| 4-semicarbazido 2,6-di-(methylamino) 1,3-diazine | 31.7 |
| Diethyl malonate | 12.0 |
| Aqueous formaldehyde (approx. 37.1% HCHO) | 48.6 |
| Sodium hydroxide in 2 parts water | 0.04 | were heated together under reflux at boiling temperature for 15 minutes. Upon cooling, a resinous syrup precipitated from solution. When a sample of this syrup was heated on a 140° C. hotplate, it cured to an infusible mass in the absence of a curing agent.

Example 9

| | Parts |
|---|---|
| 4-semicarbazido 2,6-di-(methylamino) 1,3-diazine | 31.7 |
| Glycerine | 13.8 |
| Aqueous formaldehyde (approx. 37.1% HCHO) | 48.6 |
| Sodium hydroxide in 2 parts water | 0.04 | were heated together under reflux at boiling temperature for 15 minutes. A thermoplastic resin was produced when a sample of this syrup was heated on a 140° C. hotplate. This resin was converted into a heat-curable resin by incorporating therein chloracetamide and other curing agents such as hereafter mentioned. The dehydrated, fusible resin was soluble in water and ethylene glycol but was insoluble in ethyl alcohol, benzene and Solvatone. The addition of a small amount of dilute hydrochloric acid to the thermoplastic resin caused a rapidly thermosetting resin to be formed. This cured resin had a marked resistance to water. A film of the thermosetting resin was baked on a glass plate by heating the coated plate at 60° C. for several hours. A hard, transparent, water-resistant film was formed on the plate. The product of this example is especially suitable for use in the production of varnishes and as modifier of other synthetic resinous materials.

Example 10

| | Parts |
|---|---|
| 4-semicarbazido 2,6-di-(methylamino) 1,3-diazine | 31.7 |
| Polyvinyl alcohol | 6.7 |
| Aqueous formaldehyde (approx. 37.1% HCHO) | 48.6 |
| Sodium hydroxide in 2 parts water | 0.04 |
| Water | 200.0 |

The above ingredients were heated together under reflux at boiling temperature for 15 minutes. When a sample of the resulting syrup was dehydrated by heating it on a 140° C. hotplate, a thermoplastic resin was obtained. The addition of a small amount of hydrochloric acid either to the syrupy condensation product or to the dehydrated syrup yielded a heat-convertible resin which cured rapidly at temperatures of the order of 140° C. to an insoluble, infusible state. When a sample of the syrup, to which a small amount of hydrochloric acid had been added, was applied to a glass plate and the coated plate then baked at 60° C. for several hours, a baked film was formed on the plate that was hard, translucent, smooth and water resistant. Instead of hydrochloric acid, chloracetamide or other curing agents such as hereafter mentioned may be incorporated into the syrupy resin or into the dehydrated, fusible material to accelerate or to effect the conversion of the soluble, fusible resin to an insoluble, an infusible or an insoluble and infusible state.

Instead of using chloracetamide (monochloracetamide) or hydrochloric acid as above described to obtain a heat-curable resinous composition of accelerated curing characteristics, thermosetting compositions may be produced by adding to the syrupy condensation product or to the dehydrated resin direct or active curing catalysts (e. g., phthalic anhydride, citric acid, etc.), or latent curing catalysts (e. g., sodium chloracetate, N-diethyl chloracetamide, glycine ethyl ester hydrochloride, etc.), or by intercondensation with curing reactants other than monochloracetamide (e. g., di- and tri-chloracetamides, chloracetonitriles, alpha, beta-dibrompropionitrile, aminoacetamide hydrochloride, aminoacetonitrile hydrochloride, ethylene diamine monohydrochloride, diethanol amine hydrochloride, nitrourea, glycine, sulfamic acid, chloracetyl urea, chloracetone, citric diamide, phenacyl chloride, chloral urea, polysalicylide, etc.). Other examples of active and latent curing catalysts and of curing reactants that may be employed to accelerate or to effect the curing of the thermosetting or potentially thermosetting resins of this and other examples are given in various D'Alelio copending applications, for instance in copending application Serial No. 346,962, filed July 23, 1940, and Serial No. 354,395, filed August 27, 1940, both of which applications are assigned to the same assignee as the present invention.

Instead of the 4-semicarbazido 2,6-di-(methylamino) 1,3-diazine mentioned in the above examples, we may use any of the other diazine derivatives such as herein described, alone or mixed with each other, for instance a 2-semicarbazido ($-NRNRCONHR$) or -thiosemicarbazido ($-NRNRCSNHR$) 4,6-diamino[$(-NHR)_2$] 1,3-diazine, a 4-semicarbazido or -thiosemicarbazido 2,6-diamino 1,3-diazine, a 5-alkyl or -aryl 2-semicarbazido or -thiosemicarbazido 4,6-diamino 1,3-diazine, a 5-alkyl or -aryl 4-semicarbazido or -thiosemicarbazido 2,6-diamino 1,3-diazine, etc., more specific examples being 2-semicarbazido ($-NHNHCONH_2$) 4,6-diamino 1,3-diazine, 2-thiosemicarbazido ($-NHNHCSNH_2$) 4,6-diamino 1,3-diazine, 4-semicarbazido ($-NHNHCONH_2$) 2,6-diamino 1,3-diazine, 4-thiosemicarbazido ($-NHNHCSNH_2$) 2,6-diamino 1,3-diazine, etc.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, croton aldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, substituted ureas, thioureas, selenoureas and iminoureas (numerous examples of which are given in D'Alelio copending application Serial No. 377,-

524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524, etc. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and aldehyde-addition products may be employed, e. g., mixtures of formaldehyde and methylol compounds such, for instance, as dimethylol urea and trimethylol melamine.

The ratio of the aldehydic reactant to the diazine derivative may be varied over a wide range, but the aldehydic component ordinarily is employed in an amount corresponding to at least one mol of the aldehyde, specifically formaldehyde, for each mol of the diazine derivative. Thus we may use, for example, from one to five or six or more mols of an aldehyde for each mol of diazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloracetonitriles, etc.; acylated ureas, more particularly halogenated acylated ureas of the kind described, for example, in D'Alelio copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with the aminotriazines or the aminodiazoles, alone or admixed with, for instance, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a semicarbazido diazine or a thiosemicarbazido diazine of the kind herein described and an aldehyde, e. g., formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloracetic, propionic, butyric, valeric, acrylic, polyacrylic, methacrylic, oxalic, polymethacrylic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a diazine derivative corresponding to the general formula

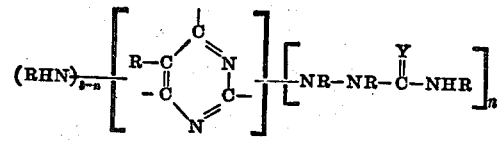

wherein $n$ is an integer and is at least 1 and not more than 3, R is a member of the class consisting of hydrogen and monovalent hydrocarbon and halo-hydrocarbon radicals, and Y is a member of the class consisting of oxygen and sulfur.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A composition comprising a condensation product of ingredients comprising an aldehyde and a diazine derivative corresponding to the general formula

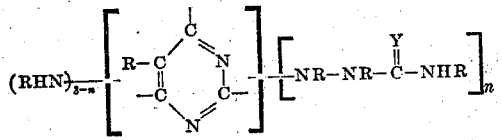

where $n$ is an integer and is at least 1 and not more than 3, Y is a member of the class consisting of oxygen and sulfur, and R represents hydrogen.

6. A heat-curable resinous composition comprising the heat-convertible reaction product of ingredients comprising formaldehyde and a diazine derivative corresponding to the general formula

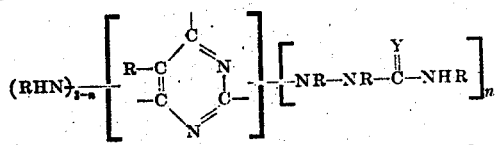

where $n$ is an integer and is at least 1 and not more than 3, R represents hydrogen and Y represents oxygen.

7. A product comprising the heat-cured resinous composition of claim 6.

8. A resinous composition comprising the product of reaction of ingredients comprising 4-semicarbazido 2,6-diamino 1,3-diazine and formaldehyde.

9. A resinous composition comprising the product of reaction of ingredients comprising 4-semicarbazido 2,6-di(methylamino) 1,3-diazine and formaldehyde.

10. A resinous composition comprising the product of reaction of ingredients comprising formaldehyde and 4-thiosemicarbazido 2,6-diamino 1,3-diazine.

11. A composition comprising the product of reaction of ingredients comprising a urea, an aldehyde and a diazine derivative corresponding to the general formula

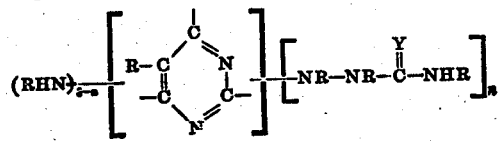

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

12. A heat-curable resinous composition comprising the heat-convertible reaction product of (1) a partial condensation product of ingredients comprising formaldehyde and a diazine derivative corresponding to the general formula

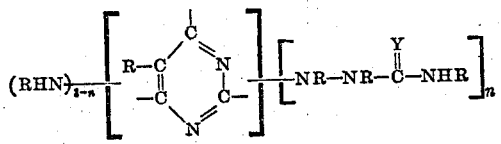

where $n$ is an integer and is at least 1 and not more than 3, Y is a member of the class consisting of oxygen and sulfur, and R represents hydrogen, and (2) a curing reactant.

13. A resinous composition as in claim 12 wherein the curing reactant is a chlorinated acetamide.

14. A product comprising the heat-cured composition of claim 12.

15. A resinous composition comprising the product of reaction of (1) a partial condensation product of ingredients comprising urea, 4-semicarbazido 2,6-diamino 1,3-diazine and formaldehyde and (2) chloracetamide.

16. A resinous composition comprising the product of reaction of (1) a partial condensation product of ingredients comprising urea, 4-semicarbazido 2,6-di-(methylamino) 1,3-diazine and formaldehyde and (2) chloracetamide.

17. A resinous product of reaction of ingredients comprising dimethylol urea, 4-semicarbazido 2,6-diamino 1,3-diazine and chloracetamide.

18. The method of preparing new condensation products which comprises effecting reaction between ingredients comprising an aldehyde and a diazine derivative corresponding to the general formula

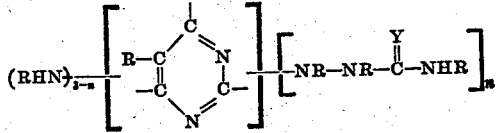

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

GAETANO F. D'ALELIO.
JAMES W. UNDERWOOD.